United States Patent [19]

Mayo et al.

[11] Patent Number: 5,759,694

[45] Date of Patent: Jun. 2, 1998

[54] CARBAMATE FUNCTIONAL POLYMERS AND OLIGOMERS AND COATING COMPOSITIONS CONTAINING SAME

[75] Inventors: Michael A. Mayo, Pittsburgh; Daniel E. Rardon, Gibsonia; Leigh-Ann Humbert, Allison Park, all of Pa.

[73] Assignee: PPG Industries, Inc., Pittsburgh, Pa.

[21] Appl. No.: 885,553

[22] Filed: Jun. 30, 1997

Related U.S. Application Data

[60] Provisional application No. 60/025,608 Sep. 4, 1996.

[51] Int. Cl.$^6$ .............................. B32B 27/00; C08F 20/00
[52] U.S. Cl. ........................ 428/423.1; 528/296; 528/300; 528/301; 528/302; 525/437; 525/441; 525/443; 525/445; 525/447; 525/448; 525/449; 525/540
[58] Field of Search ............................... 528/296, 300, 528/301, 302; 525/437, 441, 443, 445, 447, 448, 449, 540; 428/423.1

[56] References Cited

U.S. PATENT DOCUMENTS

| | | | |
|---|---|---|---|
| 3,479,328 | 11/1969 | Nordstrom | 526/312 |
| 4,147,679 | 4/1979 | Scriven et al. | 523/404 |
| 4,279,833 | 7/1981 | Culbertson et al. | 558/393 |
| 4,403,003 | 9/1983 | Backhouse | 427/407.1 |
| 4,543,276 | 9/1985 | Parekh | 427/388.3 |
| 5,071,904 | 12/1991 | Martin et al. | 524/458 |
| 5,098,974 | 3/1992 | Kania et al. | 526/310 |
| 5,336,566 | 8/1994 | Rehfuss | 428/524 |
| 5,356,669 | 10/1994 | Rehfuss et al. | 427/407.1 |
| 5,412,049 | 5/1995 | Argyropoulos et al. | 526/312 |
| 5,475,064 | 12/1995 | Menovcik et al. | 525/441 |
| 5,593,733 | 1/1997 | Mayo | 427/407.2 |
| 5,593,785 | 1/1997 | Mayo et al. | 428/423.1 |

FOREIGN PATENT DOCUMENTS

| | | |
|---|---|---|
| 0 257 848 | 3/1988 | European Pat. Off. . |
| 0 594 142 | 4/1994 | European Pat. Off. . |

*Primary Examiner*—Samuel A. Acquah
*Attorney, Agent, or Firm*—Krisanne Shideler; Kenneth J. Stachel

[57] ABSTRACT

A novel polyester is provided comprising the reaction product of: (1) an acid functional polyester which is prepared from: (a) a material of the structure:

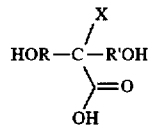

wherein X is a lower alkyl group having from about 1 to about 4 carbon atoms, and R and R' are independently lower alkylene groups having from about 1 to about 4 carbon atoms; (b) a polyol different from (a); and (c) a polyacid; and (2) a monoepoxide containing from about 3 to 20 carbon atoms. The reaction product is carbamoylated. The carbamoylated polyester can be present in a film-forming composition also having a carbamate functional acrylic polymer; and an aminoplast crosslinking agent. Also such a film-forming composition can be a clear coat in a multi-component composite coating composition.

26 Claims, No Drawings

CARBAMATE FUNCTIONAL POLYMERS AND OLIGOMERS AND COATING COMPOSITIONS CONTAINING SAME

This application claims the benefit of the U.S. Provisional application Ser. No. 60/025,608 filed on Sep. 4, 1996.

CROSS REFERENCE TO RELATED APPLICATIONS

Reference is made to related U.S. patent application Ser. No. 08/494,905, filed on Jun. 26, 1995, now U.S. Pat. No. 5,593,785, and U.S. patent application Ser. No. 08/562,234, filed on Nov. 21, 1995, now U.S. Pat. No. 5,593,785.

FIELD OF THE INVENTION

The present invention relates to novel carbamate functional polymers and oligomers, their use in aminoplast-curable film-forming compositions, and multi-component composite coating compositions comprising a pigmented or colored base coat and a transparent or clear topcoat.

BACKGROUND OF THE INVENTION

Color-plus-clear coating systems involving the application of a colored or pigmented base coat to a substrate followed by the application of a transparent or clear topcoat to the base coat have become very popular as original finishes for automobiles. The color-plus-clear systems have outstanding gloss and distinctness of image. The clear coat is particularly important for these properties.

Coating compositions based on hydroxyl functional acrylic polymers and aminoplast crosslinking agents are particularly desirable as automotive top coats because they have excellent durability, hardness, gloss, and appearance. Conventional coating systems that contain hydroxyl functional film-forming resins and aminoplast crosslinking agents rely on a cure mechanism wherein hydroxyl groups on the resin react with the aminoplast to form ether linkages; see, for example, European Patent Application No. 0257848. It is believed that such ether linkages in commercial high solids systems are vulnerable to acid attack and hence show poor acid etch resistance.

Because many geographic areas encounter acidic precipitation, acid resistance in coatings is becoming an increasingly desirable property, particularly for automotive coatings. When acidic rain water, also known as acid rain, accumulates on a horizontal section of an automobile such as a hood or trunk deck, it spots and can actually etch away the clear coat leaving a blemish that cannot be polished out. High solids hydroxyl-aminoplast coating systems of the prior art are not highly effective for providing protection against etching caused by acid rain.

It has been found that acrylic polymers containing pendant carbamate groups can be cured with aminoplast crosslinking agents to yield acid etch resistant clear coats. U.S. Pat. Nos. 5,356,669 and 5,336,566; EPO 0594142 A1 and EPO 0590068 A1 disclose such polymers.

Menovcik et al. in U.S. Pat. No. 5,475,064 disclose coating compositions containing aminoplasts and specific carbamate functional polyesters. These polyesters have only pendant carbamate functionality from the reaction of a half ester diacid with appended carbamate group and a polyol. The diacid results from the reaction of cyclic anhydride and the reaction product of hydroxyalkylcyclic carbonate with ammonia.

Culbertson et al. in U.S. Pat. No. 4,279,833 disclose specific carbamate functional acrylic monomers, polymers prepared therefrom, and coating compositions containing aminoplasts and these acrylic polymers. The monomers are prepared from 2-(1-hydroxyalkyl)-acrylates, acrylonitriles, acrylamides, vinyl ketones, or nitroethylenes. The acrylic carbamate monomers can have functional groups such as ester, nitrile, amide, ketone, and nitro. The resulting polymers prepared with these monomers are useful in coatings on metal and other substrates and reportedly give excellent adhesion, mar-resistance and resistance to acids, bases, and many types of solvents. As shown in Exhibit IV, pigmented latex coating when drawn down on a substrate showed a gloss of 90 for 60° C. and 80 for 20° C. and chemical stability with salt solutions. Acid etch resistance and recoatability were not reported.

Parekh in U.S. Pat. No. 4,543,276 discloses coating compositions containing urethane compounds and any of a number of listed polymers which can have functional groups such as hydroxyl, acidic and —(CONH$_2$). The former is present in an amount from 10 to 50 percent by weight and the latter in an amount of 50 to 90 percent by weight. The coating composition is curable at elevated temperatures and provides a highly crosslinked coating having high solvent resistance, good dry film properties, high resistance to weathering including light and oxidative degradation.

A problem frequently encountered with coating systems containing aminoplasts and carbamate functional acrylic polymers is poor adhesion between coating layers ("intercoat adhesion") and recoat adhesion, particularly when a base coat or clear coat layer is applied over another clear coat layer during on-line repairs of original equipment paint jobs, and when a clear coat is applied over an electrocoat layer or a base coat is applied over a clear coat layer during custom two-tone painting. Two-tone painting involves the application of a base coat and clear coat system to an entire automotive part or portion thereof, after which an area is covered or "masked" so that the remaining exposed area can be painted with a different colored base coat followed by a clear coat. In these situations a base coat or a clear coat may be applied on top of a clear coat layer or on top of an electrocoated layer which has clear coat overspray on it.

SUMMARY OF THE INVENTION

It is an object of the present invention to provide a coating composition having improved intercoat or recoat adhesion and acid etch resistance, while maintaining appearance properties, and utilizing less expensive existing aminoplast crosslinking agents, suitable for use in a color-plus-clear composite coating system.

In accordance with the present invention, a novel polyester is provided comprising the reaction product of:

(1) an acid functional polyester prepared from:
 (a) a hydroxyl functional and acidic functional material of the structure:

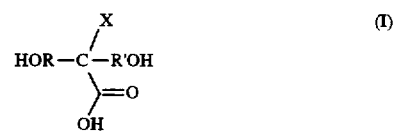

(I)

wherein X is a lower alkyl group having from about 1 to about 4 carbon atoms, and R and R' are independently lower alkylene groups having from about 1 to about 4 carbon atoms; (b) at least one polyol different from (a); and (c) at least one polyacid; and (2) a monoepoxide containing from about 3 to about 20 carbon atoms. The reaction product is carbamoylated and contains a plurality of terminal and/or pendant carbamate groups of the structure:

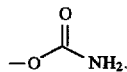

(II)

A film-forming composition is also provided comprising (i) an acrylic polymer present in the film-forming composition in amounts of about 10 to about 55 percent by weight based on the total weight of resin solids in the film-forming composition and containing a plurality of groups of the structure:

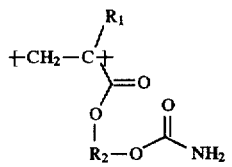

(III)

wherein $R_1$ is hydrogen or methyl and $R_2$ is a divalent linking group; (ii) the polyester described above, present in the film-forming composition in amounts of about 12 to about 55 percent by weight based on the total weight of resin solids in the film-forming composition; and (iii) an aminoplast crosslinking agent containing methylol and/or methylol ether groups, present in the film-forming composition in amounts of about 25 to about 50 percent by weight based on the total weight of resin solids in the film-forming composition.

A multi-component composite coating composition is also provided. The coating composition comprises a pigmented film-forming composition serving as a base coat and a clear film-forming composition serving as a transparent topcoat over the base coat. The transparent topcoat, or clear coat, is derived from the curable film-forming composition described above.

DETAILED DESCRIPTION

The polyester of the present invention can be a polymeric or oligomeric material. The polymers or oligomers having a plurality of ester groups in the backbone are prepared by a condensation reaction as known by those skilled in the art. A typical temperature range for polyester synthesis is about 180° C. to about 220° C. and reaction pressures generally are ambient. Such conditions are suitable for the formation of the polyesters of the present invention.

In the aforementioned component (a) that is a reactant to form the acid functional polyester, X of Structure I may be a linear or branched alkyl group, and is preferably methyl. Also, R and R' may be linear or branched alkylene groups. Both R and R' are preferably methylene. Component (a) is preferably dimethylol propionic acid. Component (a) can be used in an amount of about 10 to about 40, preferably about 10 to about 30 percent by weight, based on the total weight of reactants (including the monoepoxide) used to prepare the polyester reaction product. Note that the sum of the amounts of the reactants to prepare the polyester of the present invention in weight percent preferably equals 100 percent.

Polyols (b) that can be used to prepare the acid functional polyester include dihydric alcohols. Specific examples include ethylene glycol, 1,6-hexanediol, neopentyl glycol, and 2,2-dimethyl-3-hydroxypropyl-2,2-dimethyl-3-hydroxypropionate, which is preferred. Other suitable diols include hydrogenated Bisphenol A, cyclohexanediol, cyclohexanedimethanol, caprolactone-based diols such as the reaction product of e-caprolactone and ethylene glycol, hydroxy-alkylated bisphenols, polyether glycols such as poly(oxytetramethylene)glycol, and the like.

The polyol component may comprise only diols, or polyols of higher functionality may also be used in small amounts. Examples of polyols of higher functionality would include trimethylol ethane, trimethylol propane, pentaerythritol, and the like.

The polyol can be used in an amount of about 10 to about 60, preferably about 20 to about 45 percent by weight, based on the total weight of reactants (including the monoepoxide) used to prepare the polyester reaction product.

The polyacids (c) used to prepare the acid functional polyester are primarily monomeric polycarboxylic acids or anhydrides thereof having 2 to 18 carbon atoms per molecule. Among the acids that are useful are phthalic acid, hexahydrophthalic acid, adipic acid, sebacic acid, maleic acid, and other dicarboxylic acids of various types known to those skilled in the art. Minor amounts of monobasic acids can be included in the reaction mixture, for example, benzoic acid, stearic acid, acetic acid, and oleic acid. Also, small amounts of higher carboxylic acids can be used, for example, trimellitic acid and tricarballylic acid. Anhydrides of the acids referred to above, where they exist, can be used in place of the acid. Methylhexahydrophthalic anhydride is preferred. The polyacid can be used in an amount of about 10 to about 70, preferably about 40 to about 60 percent by weight, based on the total weight of reactants (including the monoepoxide) used to prepare the polyester reaction product.

The polymeric or oligomeric material produced by the reaction of component (a), the polyol (b), and the polyacid (c), preferably contains terminal hydroxyl functionality and contains pendant acid functionality along the polymer chain. The latter is due to the acid functionality in component (a). The acid functionality along the chain can then be reacted with a monoepoxide to yield the polyester with pendant hydroxyl functionality. In the reaction of the acid functional polyester and the monoepoxide, acid functionality on the polyester material reacts with the epoxide to yield beta-hydroxy ester groups. A typical temperature range for this reaction is about 130° C. to about 160° C. Reaction pressures can be ambient pressures.

Suitable monoepoxides include aliphatic and cycloaliphatic monoepoxides containing from about 3 to about 20 carbon atoms such as propylene oxide and any monoepoxides which may be prepared by the reaction of epichlorohydrin and a monohydroxyl or monocarboxylic acid functional material. A particularly preferred monoepoxide is a glycidyl ester monoepoxide available commercially as CARDURA E from Shell Oil and Chemical Co., or GLYDEXX-10 available from Exxon Chemicals America. The monoepoxide is reacted with the carboxylic acid groups on the polyester in a stoichiometric ratio of about 0.5 to 1.5:1.

The polyester of the present invention contains a plurality of terminal and/or pendant carbamate groups of Structure II. Carbamate functional groups may be incorporated into the polyester by reacting terminal and pendant hydroxyl groups on the polyester with a low molecular weight carbamate functional material via a "transcarbamoylation" reaction. In this reaction, a low molecular weight carbamate functional material derived from an alcohol or glycol ether is reacted with the hydroxyl groups of the polyester polymer or oligomer, yielding a carbamate functional polyester polymer or oligomer and the original alcohol or glycol ether. The low molecular weight carbamate functional material derived from an alcohol or glycol ether is first prepared by reacting the alcohol or glycol ether with urea in the presence of a catalyst such as butyl stannoic acid. Suitable alcohols include lower molecular weight aliphatic, cycloaliphatic, and aromatic alcohols such as methanol, ethanol, propanol, butanol, cyclohexanol, 2-ethylhexanol, and 3-methylbutanol. Suitable glycol ethers include ethylene glycol methyl ether and propylene glycol methyl ether. Propylene glycol methyl ether is preferred.

Alternatively, carbamate functionality may be incorporated into the polyester polymer or oligomer by reacting isocyanic acid with the hydroxyl functionality of the polyester. Transcarbamoylation is the preferred method of imparting pendant and terminal carbamate functionality to the polyester.

The polyester polymer or oligomer typically has a number average molecular weight (Mn) of from about 500 to about 10,000, preferably from about 500 to about 3000 as determined by gel permeation chromatography using a polystyrene standard. Also, the polyester polymer typically has a carbamate equivalent weight within the range of about 200 to about 1000, preferably about 200 to about 800, based on equivalents of reactive terminal and pendant carbamate groups. The equivalent weight is a calculated value based on the relative amounts of the various ingredients used in making the polyester and is based on solids of the polyester.

The polyester polymer or oligomer is present in the film-forming composition of the present invention in amounts of about 12 to about 55, preferably about 20 to about 45 percent by weight based on the total weight of resin solids in the film-forming composition.

The acrylic polymers that can be used in the film-forming composition of the present invention along with the polyester polymer are copolymers of one or more alkyl esters of acrylic acid or methacrylic acid, and, optionally, one or more other polymerizable ethylenically unsaturated monomers. Suitable alkyl esters of acrylic or methacrylic acid include methyl methacrylate, ethyl methacrylate, butyl methacrylate, ethyl acrylate, butyl acrylate, and 2-ethylhexyl acrylate, and the like. Suitable other polymerizable ethylenically unsaturated monomers include vinyl aromatic compounds such as styrene and vinyl toluene; nitriles such as acrylonitrile and methacrylonitrile; vinyl and vinylidene halides such as vinyl chloride and vinylidene fluoride and vinyl esters such as vinyl acetate. The acrylic polymers may contain hydroxyl functionality which can be incorporated into the acrylic polymer through the use of hydroxyl functional monomers such as hydroxyethyl acrylate, hydroxypropyl acrylate, hydroxyethyl methacrylate, and hydroxypropyl methacrylate which may be copolymerized with the other acrylic monomers.

The acrylic polymer may be prepared by solution polymerization techniques in the presence of suitable initiators such as organic peroxides or azo compounds, for example, benzoyl peroxide or N,N-azobis(isobutyronitrile). The polymerization may be carried out in an organic solution in which the monomers are soluble by techniques conventional in the art. Other polymerization techniques which may be used to prepare the acrylic polymer include emulsion or suspension polymerization.

The acrylic polymer preferably contains a plurality of groups of the aforementioned Structure III wherein the R$_2$, divalent linking group may be a linear or a branched aliphatic alkylene group such as methylene, ethylene, methyl ethylene, butylene, and the like; cycloaliphatic such as cyclohexylene; aromatic; saturated or unsaturated; and may be substituted. R$_2$ may have 2 to 20 carbon atoms and may include functional groups such as urethane, ester, amide, and the like, depending on the method used to prepare the monomer that yields the group of Structure III.

Carbamate functional groups such as those depicted in Structure III may be incorporated into the acrylic polymer by copolymerizing the other acrylic monomers with a carbamate functional vinyl monomer, for example a carbamate functional alkyl ester of methacrylic acid. These carbamate functional alkyl esters are prepared by reacting, for example, a hydroxyalkyl carbamate such as hydroxypropyl carbamate with methacrylic anhydride. In the reaction product of hydroxypropyl carbamate and methacrylic anhydride, R$_2$ has the preferred structure:

Other carbamate functional vinyl monomers are, for instance, the reaction product of a hydroxyl functional acrylic monomer such as hydroxyethyl (meth)acrylate, hydroxypropyl (meth)acrylate, and the like; a diisocyanate; and a hydroxyalkyl carbamate.

Examples of suitable aromatic diisocyanates are 4,4'-diphenylmethane diisocyanate and toluene diisocyanate. Examples of suitable aliphatic diisocyanates are straight chain aliphatic diisocyanates such as 1,6-hexamethylene diisocyanate. Also, cycloaliphatic diisocyanates can be employed. Examples include isophorone diisocyanate, which is preferred, and 4,4'-methylene-bis-(cyclohexyl isocyanate).

In one embodiment, the carbamate functional vinyl monomer is the reaction product of hydroxyethyl methacrylate, isophorone diisocyanate, and hydroxypropyl carbamate, and R$_2$ may have the structure:

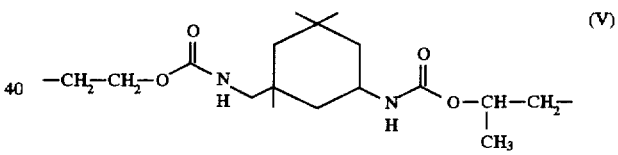

Such monomers are disclosed throughout U.S. Pat. No. 5,098,947. Still, other carbamate functional vinyl monomers may be used, such as the reaction product of isocyanic acid (HNCO) with a hydroxyl functional acrylic or methacrylic monomer such as hydroxyethyl acrylate, and those described throughout U.S. Pat. No. 3,479,328.

Carbamate groups may also be incorporated into the acrylic polymer by reacting a hydroxyl functional acrylic polymer with isocyanic acid or with a low molecular weight carbamate functional material via a transcarbamoylation process similar to the one described above in connection with the incorporation of carbamate groups into the polyester polymers or oligomers.

The acrylic polymer typically has a Mn of from about 1000 to about 10,000, preferably from about 1000 to about 5000 as determined by gel permeation chromatography using a polystyrene standard. Also, the acrylic polymer typically has a calculated carbamate equivalent weight of about 200 to about 1000, preferably within the range of about 200 to about 600, based on equivalents of reactive carbamate groups.

The carbamate functional acrylic polymer is present in the film-forming composition in amounts of about 10 to about 55, preferably about 12 to about 35 percent by weight based on the total weight of resin solids in the film-forming composition. Preferably, the film-forming composition of the present invention has the polyester polymer or oligomer of the present invention in a predominant amount to the amount of the carbamate functional acrylic polymer.

Film-forming compositions of the present invention further comprise an aminoplast crosslinking agent containing methylol and/or methylol ether groups. Aminoplasts are obtained from the reaction of formaldehyde with an amine or amide. The most common amines or amides are melamine, urea, or benzoguanamine, and these are preferred. However, condensates with other amines or amides can be used; for example, aldehyde condensates of glycoluril, which give a high melting crystalline product which is useful in powder coatings. While the aldehyde used is most often formaldehyde, other aldehydes such as acetaldehyde, crotonaldehyde, and benzaldehyde may be used.

The aminoplast contains methylol groups and preferably at least a portion of these groups are etherified with an alcohol to modify the cure response. Any monohydric alcohol may be employed for this purpose including methanol, ethanol, butanol, and hexanol.

Preferably, the aminoplasts which are used are melamine-, urea-, or benzoguanamine-formaldehyde condensates etherified with an alcohol containing from one to four carbon atoms. The aminoplast is present in amounts of about 25 to about 50, preferably about 30 to about 45 percent by weight based on the total weight of resin solids in the film-forming composition.

Usually, the film-forming composition will also preferably contain catalysts to accelerate the cure of the aminoplast and carbamate groups. Examples of suitable catalysts are acidic materials and include acid phosphates and sulfonic acid or a substituted sulfonic acid such as dodecylbenzene sulfonic acid or paratoluene sulfonic acid. The catalyst is usually present in an amount of about 0.5 to about 5.0 percent by weight, preferably about 0.5 to about 1.5 percent by weight, based on the total weight of resin solids. Optional ingredients such as, for example, plasticizers, surfactants, thixotropic agents, anti-gassing agents, organic cosolvents, flow controllers, anti-oxidants, UV light absorbers and similar additives conventional in the art may be included in the composition. These ingredients are typically present at up to about 40 percent by weight based on the total weight of resin solids.

The film-forming composition of the present invention may be solventborne or waterborne; preferably, it is solventborne. Suitable solvent carriers include the various alcohols, esters, ethers, aromatic solvents, and other solvents, including mixtures thereof, that are known in the art of coating formulation. The film-forming composition typically has a total solids content of about 40 to about 60 percent by weight. Preferably, the sum of the weight percentages of the components of the film-forming composition is approximately 100 weight percent.

In the film-forming composition of the present invention, preferably the equivalent ratio of the pendant and terminal carbamate groups in the acrylic and polyester polymers and/or oligomers to methylol or methylol ether groups in the aminoplast is from about 0.5 to 2:1 and is sufficient to form a crosslinked film. The resultant crosslinked coating exhibits a high level of acid etch resistance. By "high level", it is meant that the resistance of the coating composition to etching by acid rain is significantly improved compared to conventional high solids hydroxyl-aminoplast cured coating compositions.

Preferably, prior to curing, the film-forming composition comprising the polymer(s) and/or oligomer(s) having the pendant and terminal carbamate groups and the aminoplast has a theoretical hydroxyl value less than 50, preferably less than 25, and more preferably 0. This hydroxyl value is based on solid weight of the film-forming composition, excluding any hydroxyl functionality associated with N-methylol groups such as those in an aminoplast.

By "theoretical hydroxyl value", it is meant the calculated value based on the relative amounts of the various ingredients used in making the film-forming composition rather than the actual hydroxyl value which is measured on the film-forming composition itself by conventional analytical techniques.

The film-forming composition of the present invention may contain color pigments conventionally used in surface coatings and may be used as a high gloss monocoat; that is, a high gloss pigmented coating. By "high gloss", it is meant that the cured coating has a 20° gloss and/or a DOI ("distinctness of image") measurement of at least about 80 as measured by standard techniques known to those skilled in the art.

The film-forming composition of the present invention is preferably used as the clear coat layer in a multi-component composite coating composition such as a color-plus-clear coating system, which includes at least one pigmented or colored base coat and at least one clear topcoat over the last base coat layer. The film-forming composition of the base coat in the color-plus-clear system can be any of the compositions useful in coatings applications, particularly automotive applications. The film-forming composition of the base coat typically comprises a resinous binder and a pigment to act as the colorant. Particularly useful resinous binders are acrylic polymers, polyesters, including alkyds, and polyurethanes.

The base coat compositions may be solventborne or waterborne. Waterborne base coats in color-plus-clear compositions are disclosed in U.S. Pat. No. 4,403,003, and the resinous compositions used in preparing these base coats can be used in the practice of this invention. Also, waterborne polyurethanes such as those prepared in accordance with U.S. Pat. No. 4,147,679 can be used as the resinous binder in the base coat. Further, waterborne coatings such as those described in U.S. Pat. No. 5,071,904 can be used as the base coat. Suitable solventborne coatings include any known to those skilled in the art. Examples include DCT-6373, a solventborne base coat commercially available from PPG Industries, Inc., Pittsburgh, Pa.

As mentioned above, the base coat composition further contains pigments. Color pigments conventionally used in surface coatings are suitable and include, for example, inorganic pigments such as titanium dioxide, iron oxides, chromium oxide, lead chromate, carbon black, and organic pigments such as phthalocyanine blue and phthalocyanine green. Mixtures of the above mentioned pigments may also be used. Suitable metallic pigments include in particular aluminum flake, copper bronze flake and metal oxide coated mica, nickel flakes, tin flakes, and mixtures thereof.

In general, the pigment is incorporated into the coating composition in amounts of about 1 to about 80 percent by weight based on the total weight of coating solids. The metallic pigment is employed in amounts of about 0.5 to about 25 percent by weight based on the total weight of coating solids.

If desired, the base coat composition may contain additional materials well known in the art of formulated surface coatings. These would include surfactants, flow control agents, thixotropic agents, fillers, anti-gassing agents, organic cosolvents, catalysts, and other customary auxiliaries. These materials can constitute up to about 40 percent by weight of the total weight of the coating composition.

The base coating compositions can be applied to various substrates to which they adhere including wood, metals, glass, and plastic. The compositions can be applied by conventional means including brushing, dipping, flow coating, spraying and the like, but they are most often applied by spraying. The usual spray techniques and equipment for air spraying and electrostatic spraying and either manual or automatic methods can be used.

During application of the base coat composition to the substrate, a film of the base coat is formed on the substrate. Typically, the base coat thickness will be about 0.01 to about 5 mils (about 0.254 to about 127 microns), preferably about 0.1 to about 2 mils (about 2.54 to about 50.8 microns) in thickness.

After application of the base coat to the substrate, a film is formed on the surface of the substrate by driving solvent, i.e., organic solvent or water, out of the base coat film by heating or by an air drying period. Preferably, the heating will only be for a short period of time, sufficient to ensure that the clear coat can be applied to the base coat without the former dissolving the base coat composition. Suitable drying conditions will depend on the particular base coat composition, and on the ambient humidity with certain waterborne compositions, but in general a drying time of from about 1 to 5 minutes at a temperature of about 80°–250° F. (20°–121° C.) will be adequate to ensure that mixing of the two coats is minimized. At the same time, the base coat film is adequately wetted by the clear coat composition so that satisfactory intercoat adhesion is obtained. Also, more than one base coat and multiple clear coats may be applied to develop the optimum appearance. Usually between coats, the previously applied coat is flashed; that is, exposed to ambient conditions for about 1 to 20 minutes.

The clear coat composition may be applied to the base coated substrate by any conventional coating technique such as brushing, spraying, dipping or flowing, but spray applications are preferred because of superior gloss. Any of the known spraying techniques may be employed such as compressed air spraying, electrostatic spraying and either manual or automatic methods.

After application of the clear coat composition to the base coat, the coated substrate is heated to cure the coating layers. In the curing operation, solvents are driven off and the film-forming materials of the clear coat and the base coat are each crosslinked. The heating or curing operation is usually carried out at a temperature in the range of from 160°–350° F. (71°–177° C.) but if needed, lower or higher temperatures may be used as necessary to activate crosslinking mechanisms. The thickness of the clear coat is usually from about 0.5 to about 5 mils (about 12.7 to about 127 microns), preferably about 1.2 to about 3 mils (about 30.5 to about 76.2 microns).

The invention will be further described by reference to the following examples. Unless otherwise indicated, all parts are by weight.

Examples A through F illustrate the preparation of various carbamate functional acrylic and polyester resins.

EXAMPLE A

A carbamate functional acrylic polymer was prepared from the following ingredients:

| Ingredient | Weight in Grams |
|---|---|
| 1) EXXATE ® 600[1] | 478.4 |
| 2) Butyl Acetate | 478.4 |
| 3) LUPERSOL ® 555M60[2] | 64.0 |
| 4) EXXATE 600 | 11.2 |
| 5) Butyl Acetate | 11.2 |
| 6) Hydroxypropyl acrylate | 512.0 |
| 7) Butyl methacrylate | 742.4 |
| 8) Methyl styrene dimer | 25.6 |
| 9) EXXATE 600 | 64.0 |
| 10) Butyl acetate | 64.0 |
| 11) LUPERSOL 555M60 | 21.3 |
| 12) EXXATE 600 | 11.2 |
| 13) Butyl acetate | 11.2 |
| 14) Butyl stannoic acid | 2.6 |
| 15) triphenylphosphite | 2.6 |
| 16) Methoxy propyl carbamate[3] | 1413.7 |
| 17) DOWANOL ® PM[4] | 314.0 |
| 18) Ethyl-3-ethoxypropionate | 313.0 |

[1]Oxohexyl acetate solvent available from Exxon Chemicals America.
[2]t-amyl peroxyacetate available from Atochem North America, Inc.
[3]Reaction product of 2-methoxy-1-propanol and urea: a 37% solution in 1-methoxy-2-propanol.
[4]1-methoxy-2-propanol available from DOW Chemical Co.

The first two ingredients were charged to a suitable reactor under an $N_2$ blanket and heated to reflux. The next three ingredients were mixed together and added to the reactor at a constant rate over 3.5 hours. Addition of a mixture of hydroxypropyl acrylate, butyl methacrylate, methyl styrene dimer, EXXATE 600, and butyl acetate was begun 15 minutes after the beginning of the first addition and added at a constant rate over 3 hours. After completion of the above additions, the reaction was held at reflux temperature for 1 hour. The next three ingredients were then added to the reactor over a period of 0.5 hours. The reaction was held over a period of 2 hours. Solvent was then removed from the reaction under reduced pressure. The next two ingredients were added to the reactor. Methoxy propyl carbamate in DOWANOL PM solution was then added to the reactor over a period of 3 hours. During the addition, DOWANOL PM was removed from the reactor under reduced pressure. The reaction was continued under reduced pressure until DOWANOL PM evolution stopped. The resin prior to dilution had a residual hydroxyl value of 30.6. The resin was diluted with the last two ingredients. After dilution, the resin had a measured solids content of 69.2%, a Gardner-Holt viscosity of Z2-, a number average molecular weight of 3311, and a weight average molecular weight of 7851, both as determined by gel permeation chromatography using a polystyrene standard. The calculated carbamate equivalent weight was 372 based on solids.

EXAMPLE B (Comparative)

A branched polyester having terminal carbamate functionality as prepared from the following ingredients:

| Ingrdient | Weight in Grams |
|---|---|
| ESTERDIOL ® 204[1] | 158.2 |
| Deionized water | 7.0 |

The first ingredient was charged to a suitable reactor equipped with a glycol recovery column. Deionized $H_2O$ was added to the reactor as a rinse for the first ingredient. Trimethylolpropane, butyl stannoic acid, and triphenylphosphite were then added to the reactor, followed by a deionized $H_2O$ rinse. Methylhexahydrophthalic anhydride was then added to the reactor. The reaction mixture was then heated to 77° C. and sparged with nitrogen for 20 minutes. The reaction mixture was heated to 210° C. and H₂O was removed from the reactor with the nitrogen sparge. The reaction was held until an acid value of 10.4 was achieved. The batch was then cooled to 140° C. The hydroxyl functional intermediate polyester resin had a hydroxyl value of 164.5. Transcarbamoylation was conducted as follows: DOWANOL PM and butyl stannoic acid were added to the reactor as a slurry, followed by addition of triphenylphosphite and a DOWANOL PM rinse. Methoxyl-propyl carbamate in DOWANOL PM solution was added to the reactor over a period of four hours. During the addition, DOWANOL PM was removed from the reactor under reduced pressure. Upon completion of the addition, a DOWANOL PM rinse was added to the reactor. The reaction was continued until DOWANOL PM evolution stopped. The resin prior to dilution had a residual hydroxyl value of 17.8 and an acid value of 7.9. After dilution, the resin had a measured solids content of 69.3%, a Gardner-Holt viscosity of Z3-, a number average molecular weight of 1197, and a weight average molecular weight of 3340, both as determined by gel permeation chromatography using a polystyrene standard. The calculated carbamate equivalent weight was 372 based on solids.

was added over 3–4 hours while maintaining a reaction temperature of 140° C. and removing all distillate. At the completion of the feed, the reaction pressure was gradually decreased over one hour to remove all residual transcarbamoylation by-product (methoxypropanol). The contents were then cooled to 120° C., vacuum was broken, and Charge E was added to thin the resin. Resin properties are shown in Table 1.

TABLE 1

|  | EXAMPLE C | EXAMPLE D | EXAMPLE E | EXAMPLE F |
|---|---|---|---|---|
| Charge A |  |  |  |  |
| Methylhexahydrophthalic anhydride | 257.1 | 257.1 | 257.1 | 257.1 |
| ESTERDIOL 204 | 179.9 | 240.7 | 159.1 | 167.2 |
| Dimethylol propionic acid | 118.1 | 77.7 | 131.3 | 118.1 |
| Trimethylolpropane | 0 | 0 | 0 | 5.4 |
| Butylstannoic acid | .56 | .58 | .55 | .56 |
| Triphenylphosphite | .56 | .58 | .58 | .56 |
| ACID VALUE | 103 | 60 | 100 | 103 |
| CHARGE B |  |  |  |  |
| CARDURA-E⁴ | 215.6 | 142.1 | 240.1 | 215.6 |
| CHARGE C |  |  |  |  |
| Butylstannoic acid | .80 | .80 | .85 | .80 |
| Triphenylphosphite | .80 | .80 | .85 | .80 |

EXAMPLES C–F

A general resin synthesis procedure is described for EXAMPLES C through F in which polyesters having both pendant and terminal carbamate functionality were prepared. Individual component levels (in grams) and resin properties are listed in Table 1. To a suitable flask equipped for polyester synthesis, i.e. steam-jacketed condenser, short packed column, cold water condenser to remove water of reaction, nitrogen inlet, mechanical stirrer, and thermocouple, were charged the components of Charge A. The temperature of the contents were brought to 190° C. and held while removing the water of reaction until the appropriate acid value (listed in Table 1) was achieved. The contents were cooled to 140° C., and Charge B was added all at once. The temperature was maintained at 145°–150° C. until the acid value dropped below 10. At this time, Charge C was added in one portion and the flask was refitted with a metered addition pump and a vacuum distillation setup. Charge D was placed in a suitable vessel to be pumped into the reaction flask. The pressure of the reaction flask was set at 18–20 inches vacuum (302.8–252 mm Hg), and Charge D The following examples (1–6) show the preparation of various clear film-forming compositions prepared with the polymers of Examples A–F and aminoplast curing agent. Ingredients were mixed together in the order listed in Table 2. Examples 1 and 2 are comparative; the composition of Example 1 contains no polyester and that of Example 2 contains a polyester having only terminal carbamate functionality. The compositions of Examples 3–6 each contain polyesters having both terminal and pendant carbamate functionality. The clear film-forming compositions were evaluated as clear coats in composite color-plus-clear coatings.

The film-forming compositions of Examples 1–6 were applied to a pigmented base coat to form color-plus-clear composite coatings over electrocoated steel substrates. The base coat used for Examples 1–6 is commercially available from PPG Industries, Inc. and is identified as DCT-6373 (black in color). The electrocoat used on the steel is commercially available from PPG Industries, Inc., and is identified as ED-5000.

The base coat was spray applied in two coats to electrocoated steel panels at a temperature of about 75° F. (23.9° C.). A 90-second flash time was allowed between the two base coat applications. After the second base coat application, a flash time of 5 to 10 minutes was allowed at 75° F. (23.9° C.) before the application of the clear coating composition. The clear coating compositions of Examples 1–6 were each applied to a basecoated panel in two coats with a ninety second flash at 75° F. (23.9° C.) allowed between coats. The composite coating was allowed to air flash at 75° F. (23.9° C.) for 10 to 15 minutes before baking. One panel for each clear coat example was baked for 25 minutes at 285° F. (140.6° C.) to cure both the base coat and the clear coat.

These panels were used to test acid etch resistance, appearance, and hardness. In order to test recoat adhesion of the clear coat examples, a second black colored panel for each clear coat example was prepared using the identical application procedure described above, however these panels were baked for 50 minutes at 300° F. (148.9° C.), to cure both the base coat and the clear coat, at which point each panel was allowed to cool, and then the same clear coat example was reapplied directly to the surface of the first fully-cured clear coat without applying an additional layer of base coat. The panels were then baked for 25 minutes at 275° F. (135° C.) to cure the additional layer of clear coat. The purpose of the longer bake time and temperature on the first coat of base coat and clear coat and the lower bake temperature on the second coat of clear coat was to increase the severity of adhesion failure between the two separately cured layers of clear coat. The results for acid etch resistance, appearance, and recoat adhesion over black base coat are shown in the table below.

| Clear coat Example | Gloss/DOI[1] | Tukon Hardness[2] | Acid Etch Resistance[3] | Recoat Adhesion[4] |
| --- | --- | --- | --- | --- |
| 1 | 86/90 | 12.4 | 4 | Grade 10 |
| 2 | 86/95 | 14.4 | 4 | Grade 4 |
| 3 | 83/94 | 11.9 | 5.5 | Grade 0 |
| 4 | 86/93 | 11.8 | 5.5 | Grade 2-3 |
| 5 | 86/93 | 12.5 | 5.5 | Grade 2 |
| 6 | 85/88 | 12.5 | 4 | Grade 1 |
| DCT-1002B[5] | 89/94 | 11.3 | 10 | Grade 0 |

[1]20° Gloss measured by a Glossgard II glossmeter from Pacific Scientific. DOI (distinction of image) measured using a Dorigon DOI meter from Hunter Lab. Higher numbers indicate beter gloss/clarity.
[2]Tukon hardness is the Knoop hardness values measured using a Tukon Microhardness Tester Model 300 from Wilson Instruments according to ASTM-D1474-92. Higher numbers indicate greater hardness.
[3]A solution of 35 parts deionized water and 1.2 parts sulfurous acid was prepared. The solution was applied to the surface of the test panels in the form of two rows of 50 microliter droplets using a 50 microliter octapette. The panels were then baked at 120° F. for 20 minutes. Then the panels were removed from the oven and the procedure was repeated 2 times to give a total of one hour at 120° F. After the third cycle, the panels were washed with soap and water and then dried. The panels were rated for severity of acid etch against a set of standard controls. The scale is from '0' to '10', with arating of '0' being for no visible etching and a rating of '10' being for severe etching.
[4]Recoat adhesion tested using a point scribe and template according to For Motor Company test method BI 106-01. Rating scale is from Grade 0 to Grade 10. Grade 0 = 0% coating removed, Grade 1 = <5%

The data in the table indicate that coating compositions of the present invention exhibit gloss, hardness, and recoat adhesion properties comparable to conventional hydroxylaminoplast cured systems, and exhibit greatly improved acid etch resistance. Moreover, the coating compositions of the present invention exhibit significantly better recoat adhesion than do coating compositions that contain only carbamate functional acrylic polymers. Recoat adhesion is also improved compared to coating compositions that contain polyesters having only terminal carbamate functionality.

We claim:

1. A carbamate functional polyester polymer or oligomer, comprising the reaction product of:
   (1) an acid functional polyester which is prepared from:
      (a) a hydroxyl and acidic functional material of the structure:

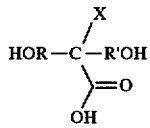

wherein X is a lower alkyl group having from about 1 to about 4 carbon atoms, and R and R' are independently lower alkylene groups having from about 1 to about 4 carbon atoms, (b) at least one polyol different from (a), and
(c) at least one polyacid, and
(2) at least one monoepoxide containing from about 3 to about 20 carbon atoms; wherein the reaction product further contains a plurality of carbamate groups of the structure:

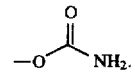

2. The polyester of claim 1 wherein component (a) is present in an amount of about 10 to about 40 percent by weight, and component (b) as the polyol is present in an amount of about 10 to about 60 percent by weight, and component (c) as the polyacid is present in an amount of about 10 to about 70 percent by weight, where all of the percent by weights are based on the total solid weight of reactants used to prepare the reaction product.

3. The polyester of claim 1 wherein component (a) is dimethylol propionic acid and is present in an amount of about 10 to about 30 percent by weight, based on the total weight of reactants used to prepare the reaction product.

4. The polyester of claim 1 wherein the polyol is present in an amount of about 20 to about 45 percent by weight, based on the total weight of reactants used to prepare the reaction product.

5. The polyester of claim 1 wherein the polyol is 2,2-dimethyl-3-hydroxypropyl-2,2-dimethyl-3-hydroxypropionate.

6. The polyester of claim 1 wherein the polyacid is present in an amount of about 40 to about 60 percent by weight, based on the total weight of reactants used to prepare the reaction product.

7. The polyester of claim 1 wherein the polyacid is methylhexahydrophthalic anhydride.

8. The polyester of claim 1 wherein the monoepoxide is a glycidyl ester monoepoxide.

9. The polyester of claim 1 wherein the monoepoxide is reacted with the carboxylic acid groups on the acid functional polyester in a stoichiometric ratio of about 0.5 to 1.5:1.

10. A curable film-forming composition comprising (i) an acrylic polymer present in the film-forming composition in amounts of about 10 to about 55 percent by weight based on the total weight of resin solids in the film-forming composition and containing a plurality of groups of the structure:

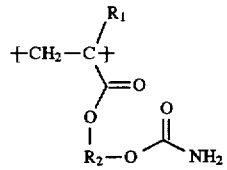

wherein $R_1$ is hydrogen or methyl and $R_2$ is a divalent linking group; (ii) the polyester of claim 2, present in the film-forming composition in amounts of about 12 to about 55 percent by weight based on the total weight of resin solids in the film-forming composition; and (iii) an aminoplast crosslinking agent containing methylol and/or methylol ether groups, present in the film-forming composition in amounts of about 25 to about 50 percent by weight based on the total weight of resin solids in the film-forming composition; wherein after curing, the film-forming composition exhibits acid etch resistance.

11. The film-forming composition of claim 10 wherein the acrylic polymer is present in the film-forming composition in amounts of about 12 to about 35 percent by weight based on the total weight of resin solids in the film-forming composition.

12. The film-forming composition of claim 10 wherein the acrylic polymer has an equivalent weight of from about 200 to about 1000 based on equivalents of said groups.

13. The film-forming composition of claim 10 wherein $R_2$ is

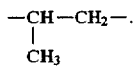

14. The film-forming composition of claim 10 wherein the polyester is present in the film-forming composition in amounts of about 20 to about 45 percent by weight based on the total weight of resin solids in the film-forming composition.

15. The film-forming composition of claim 10 wherein the polyester has an equivalent weight of from about 200 to about 1000 based on equivalents of said carbamate groups.

16. The film-forming composition of claim 10 wherein the aminoplast is present in the film-forming composition in amounts of about 30 to about 45 percent based on the total weight of resin solids in the film-forming composition.

17. The film-forming composition of claim 10 wherein said aminoplast is a condensate of melamine with formaldehyde and optionally an alcohol containing from 1 to 4 carbon atoms.

18. The film-forming composition of claim 10 wherein prior to curing, the film-forming composition has a theoretical hydroxyl value less than about 50 based on total resin solid weight of the film-forming composition, excluding any hydroxyl functionality associated with N-methylol groups.

19. A multi-component composite coating composition comprising a pigmented film-forming composition serving as a base coat and a clear film-forming composition serving as a transparent coat over the base coat wherein the transparent coat is a curable film-forming composition comprising (i) an acrylic polymer present in the clear film-forming composition in amounts of about 12 to about 55 percent by weight based on the total weight of resin solids in the clear film-forming composition and containing a plurality of groups of the structure:

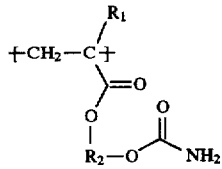

wherein $R_1$ is hydrogen or methyl and $R_2$ is a divalent linking group; (ii) the polyester of claim 2, present in the clear film-forming composition in amounts of about 12 to about 55 percent by weight based on the total weight of resin solids in the clear film-forming composition; and (iii) an aminoplast crosslinking agent containing methylol and/or methylol ether groups, present in the clear film-forming composition in amounts of about 25 to about 50 percent by weight based on the total weight of resin solids in the clear film-forming composition; wherein prior to curing, the clear film-forming composition has a theoretical hydroxyl value less than about 50 based on total resin solid weight of the clear film-forming composition, excluding any hydroxyl functionality associated with N-methylol groups; and wherein after curing, the clear film-forming composition exhibits a high level of acid etch resistance.

20. The multi-component composite coating composition of claim 19 wherein the acrylic polymer is present in the clear film-forming composition in amounts of about 12 to about 35 percent by weight based on the total weight of resin solids in the clear film-forming composition.

21. The multi-component composite coating composition of claim 19 wherein the acrylic polymer has an equivalent weight of from about 200 to about 1000 based on equivalents of said groups.

22. The multi-component composite coating composition of claim 19 wherein $R_2$ is

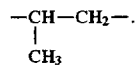

23. The multi-component composite coating composition of claim 19 wherein the polyester is present in the clear film-forming composition in amounts of about 20 to about 45 percent by weight based on the total weight of resin solids in the clear film-forming composition.

24. The multi-component composite coating composition of claim 19 wherein the polyester has an equivalent weight of from about 200 to about 1000 based on equivalents of said carbamate groups.

25. The multi-component composite coating composition of claim 19 wherein the aminoplast is present in the clear film-forming composition in amounts of about 30 to about 45 percent based on the total weight of resin solids in the clear film-forming composition.

26. The multi-component composite coating composition of claim 19 wherein said aminoplast is a condensate of melamine with formaldehyde and optionally an alcohol containing from about 1 to about 4 carbon atoms.

* * * * *

UNITED STATES PATENT AND TRADEMARK OFFICE
CERTIFICATE OF CORRECTION

PATENT NO. : 5,759,694
DATED : June 2, 1998
INVENTOR(S) : Mayo, et. al.

It is certified that error appears in the above-identified patent and that said Letters Patent is hereby corrected as shown below:

Column 1, line 13, delete "5,593,785" and insert --5,593,733--.

Column 1, line 56, insert "and" before "EPO".

Column 1, line 57, delete "and EPO 0590068 A1".

Column 6, line 45, delete "5,098,947" and insert --5,098,974--.

Signed and Sealed this

Ninth Day of February, 1999

Attest:

Attesting Officer

*Acting Commissioner of Patents and Trademarks*

UNITED STATES PATENT AND TRADEMARK OFFICE
CERTIFICATE OF CORRECTION

PATENT NO. : 5,759,694
DATED : June 2, 1998
INVENTOR(S) : Mayo et al.

It is certified that error appears in the above-identified patent and that said Letters Patent are hereby corrected as shown below:

Column 1: under the section entitled "Cross Reference to Related Applications" at line 13, delete "5,593,785" and insert --5,593,733--.

Column 1: at line 56, insert the word --and-- before the term "EPO"; and at line 57, delete the words "and EPO 0590068 A1".

Column 6: line 45, delete "5,098,947" and insert --5,098,974--.

Signed and Sealed this

Twenty-ninth Day of May, 2001

Attest:

NICHOLAS P. GODICI

*Attesting Officer*     *Acting Director of the United States Patent and Trademark Office*